United States Patent [19]

Ewing

[11] 4,246,947
[45] Jan. 27, 1981

[54] VEHICLE TIRE

[76] Inventor: Michael D. Ewing, 1706 Autumn Glow, Diamond Bar, Calif. 91765

[21] Appl. No.: 929,017

[22] Filed: Jul. 28, 1978

[51] Int. Cl.³ .................... B60C 17/00; B60C 17/04
[52] U.S. Cl. .................... 152/330 RF; 152/158; 152/375; 301/38 R; 301/39 R; 301/97
[58] Field of Search ................. 301/63 PW, 65, 38 R, 301/39 R, 95–98; 152/158, 330 R, 330 RF, 323–329, 152, 375

[56] References Cited

U.S. PATENT DOCUMENTS

| 569,370 | 10/1896 | Corliss | 152/158 |
|---|---|---|---|
| 1,378,313 | 5/1921 | Beasley | 152/158 |
| 1,379,843 | 5/1921 | Williams | 301/65 |
| 1,387,529 | 8/1921 | Williams | 301/65 |
| 1,540,414 | 6/1925 | Montupet | 301/65 |
| 2,074,284 | 3/1937 | Stevenson | 152/158 |
| 3,550,664 | 12/1970 | Lee | 152/158 |
| 4,091,854 | 5/1978 | French et al. | 152/158 |

Primary Examiner—John E. Kittle
Attorney, Agent, or Firm—Roger A. Marrs

[57] ABSTRACT

A vehicle tire is disclosed herein having a central hub with attachment holes for wheel studs provided therein. The perphery of the hub is provided with an integral flange supporting a plurality of loops and spokes or braces arranged in spatial relationship about the entire circumference of the hub. A rubber or the like tire casing is carried over the plurality of loops or braces and the terminating edges and sides of the tire casing are vulcanized or otherwise bonded to the portion of the loops or braces and to the hub. Air is captured between the hub flange and inside surfaces of the tire casing so as to provide a soft vehicle tire reinforced by the loops and spokes or braces.

9 Claims, 5 Drawing Figures

VEHICLE TIRE

BACKGROUND OF THE INVENTION

1. Field of the Invention

This invention relates to a pneumatic vehicle tire and more particularly to a novel vehicle tire having internal structural ribs or braces capped with a rubber tire so as to support a vehicle upon deflation thereof.

2. Brief Description of the Prior Art

In the past, it has been a conventional practice to provide pneumatic or inflatable tires for automobiles or other vehicles which upon accidental deflation failed to support the vehicle. In such an instance, the vehicle is not under control of the operator and substantial damage is caused to the tires, vehicle and possibly to the operator and passengers thereof.

Some attempts have been made to produce pneumatic tires which slowly deflate so that the vehicle is partially supported until the driver or operator can bring the vehicle to a controlled stop. In some instances, a plurality of bladders or inner tubes are provided which deflate in sequence to provide temporary support of the vehicle during the aforementioned efforts of the operator to gain control. Also, pneumatic tires have been substantially reinforced with plastic fibers and/or steel belts or the like in an effort to support the vehicle after deflation of the tire. Some of the tires which have been provided for safety purposes are disclosed in U.S. Pat. Nos. 1,540,414; 1,387,529 and 1,379,843. Although wheels patterned after the inventions disclosed in these letter patents have been successful for some safety purposes, these vehicle wheels are of a solid variety and do not provide for a soft ride for occupants of the vehicle. Also, should the tire fail, the vehicle will lose control and the operator cannot further drive the vehicle without substantial damage to the wheel. In some instances, the tread may separate from the wheel structure which is, of course, undesirable.

Another problem residing with conventional vehicle tires resides in the fact that no warning is given to the vehicle operator upon collapsing or reduction of pressure in the tire. Also, some pneumatic tires will not permit retreading or recapping once the tread has been substantially worn.

Therefore, a long standing need has existed to provide a safety vehicle tire which will provide a warning upon collapse or deflation to the vehicle operator and which will support the vehicle during collapse or reduction of pressure so that the operator may continue to maintain control over the vehicle.

SUMMARY OF THE INVENTION

Accordingly, the above problems and difficulties have been obviated by the present invention which provides a novel pneumatic vehicle tire having a central hub or wheel portion provided with a plurality of aperatures or holes intended to receive wheel studs for mounting thereon. The periphery of the hub is integrally formed with a band or flange having opposite edges for supporting the ends of a plurality of spokes, ribs or loops. Preferably, each of the spokes or loops is integrally formed with the opposite edges of the flange by casting, welding or otherwise providing an integral connection therebetween. The plurality of spokes or loops are arranged in fixed spaced apart relationship about the entire circumference of the hub flange and a tire or tread member is carried over all of the spokes or loops by vulcanizing the tire member to the flange and the adjacent or associated spokes and loops. Air is captured within the tire so as to provide a pneumatic ride and support for the vehicle.

Therefore, it is among the primary objects of the present invention to provide a novel vehicle tire having internal supporting means for supporting the vehicle and its occupants during reduction of pneumatic pressure or complete loss thereof during the operation of a vehicle.

Another object of the present invention is to provide a novel vehicle tire offering a soft ride to the vehicle and its occupants but incorporating internal ribs or braces in the form of loops, spokes intended to support the vehicle during partial or full deflation of the tire.

Still a further object of the present invention is to provide an economical vehicle tire which provides safety features and which is economical to manufacture and which may be used by the general public without special assembly or handling.

A further object of the present invention is to provide a novel vehicle tire of the pneumatic variety which will reduce swerving of the vehicle during emergency conditions by providing side load support for the sidewall of the tire.

BRIEF DESCRIPTION OF THE DRAWINGS

The feature of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

DESCRIPTION OF PREFERRED EMBODIMENTS

Figure 1:
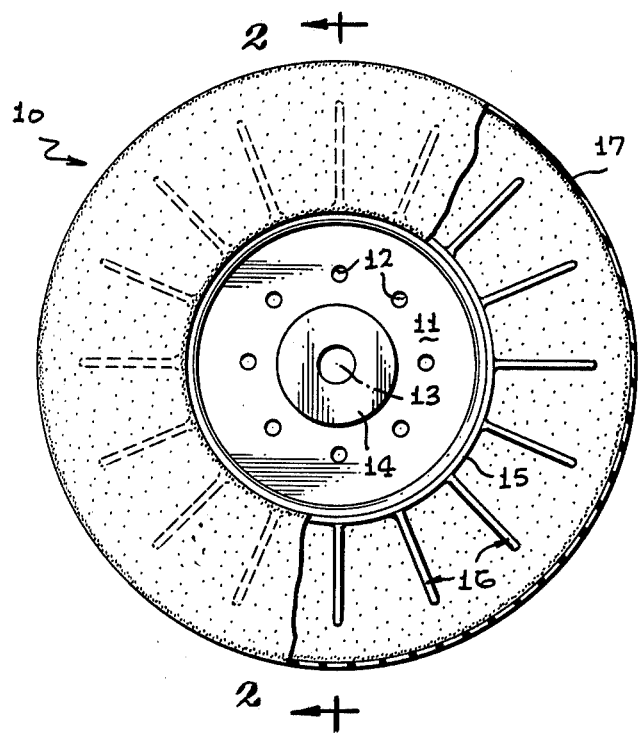
FIG. 1 is a side elevational view of the novel vehicle tire incorporating the present invention and illustrating a portion thereof broken away to expose the internal parts.

Referring to FIG. 1, the novel pneumatic vehicle tire of the present invention is illustrated in the general direction of arrow 10 which includes a central hub indicated in general by the numeral 11. The hub includes a plurality of openings or holes 12 intended to receive studs from an axle hub. The axle is illustrated by numeral 13 as occupying an opening or hole in the hub 11 which is surrounded by a thickened support portion 14. The hub 11 terminates at its periphery with a flange 15. The flange 15 supports a plurality of outwardly projecting spokes or loops indicated by the numeral 16. The plurality of spokes or loops 16 radiate outwardly from the center of the hub and are integrally formed with the opposite edges of the flange 15. The vehicle tire 10 is completed by covering all of the spokes or loops with a tread member 17 having sidewalls which are vulcanized or otherwise bonded to the edge marginal region of the flange sides and to the adjacent portions of each of the spokes or loops 16.

Figure 2:
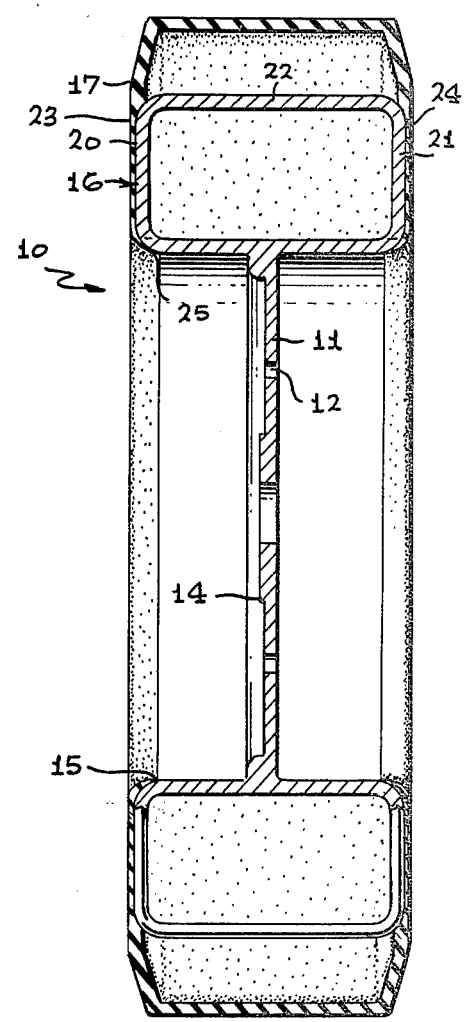
FIG. 2 is an enlarged transverse cross sectional view of the novel vehicle tire shown in FIG. 1 as taken in the direction of arrows 2—2 thereof.

Referring now in detail to FIG. 2, it can be seen that the loops or spokes 16 are integral with the flange 15 and that the flange projects outwardly from opposite sides of the hub 11. The spokes or loops include side portions 20 and 21 which are joined at their outer ends by a cross piece 22 and joined at their inner ends by the flange 15. However, it it to be particularly noted that an integral construction is provided and it is preferred that the integrations be accomplished by a casting method or means. It can also be seen in FIG. 2 that the sidewalls 23 and 24 of the tread 17 extends substantially above the cross piece 22 of each spoke or loop and that the sidewall 23 and 24 are bonded over and under the edge marginal region of the flange 15 where it joins with the spoke or loop braces 16. This bonding point is illustrated by numeral 25 which represents the maximum point of bond.

Figure 3:
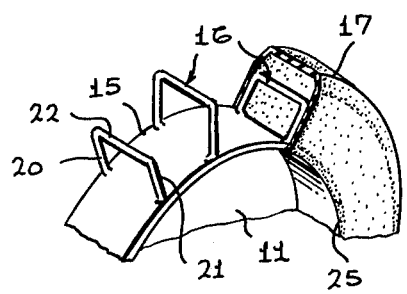
FIG. 3 is a fragmentary prospective view of the novel vehicle tire shown in FIGS. 1 and 2.

Referring now in general to FIG. 3, it can be seen that the plurality of loops 16 are arranged in fixed spaced apart relationship on the flange 15 and that they outwardly project in a radiating manner. It can also be seen in this broken away, prospective view, that the tire casing 17 is attached to the flange and the adjacent members 23 and 24 by bonding such that air is captured within the tire casing 17 to provide a soft ride.

Figure 4:
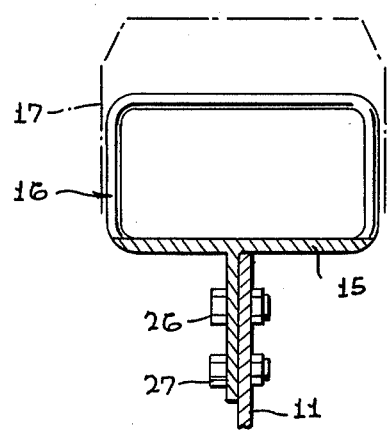
FIG. 4 is a partial cross sectional view of another version of the novel vehicle tire of the present invention.

Referring now in detail to FIG. 4, another version of the present invention is illustrated wherein the flange 15 is a separate member from the hub 11 and is attached thereto by bolts 26 and 27. In this manner, the spokes or loops 16 may be cast onto the flange or with the flange 15 and the unit can be assembled onto the hub at a later time.

Figure 5:
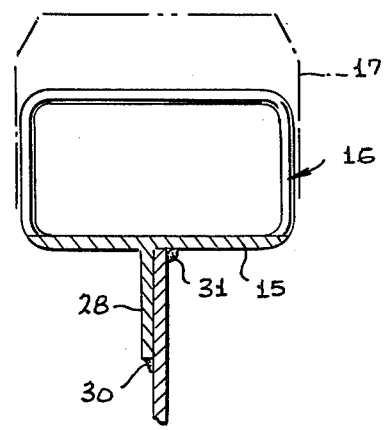
FIG. 5 is still another version of the novel vehicle tire incorporating the present invention.

With respect to FIG. 5, still another version of construction is disclosed wherein the spokes or loops 16 are cast onto the flange 15 which includes an annular member 28 that is then welded to the one side of the hub 11. Suitable weld fillets are shown by numerals 30 and 31 respectively.

In view of the foregoing, it can be seen that the novel tire of the present invention provides a means for supporting the vehicle in case of deflation or loss of pneumatic support. For example, should air escape from the tire 17 and the tire collapse, the vehicle will be supported on the plurality of spokes 16 with the weight of the vehicle being distributed into the hub as the wheel turns. Complete load of the vehicle will be via the spokes and into the hub 11. Also, lateral support is provided by the upright spokes as the vehicle is cornering or swerving in an emergency condition. The load in this latter instance is encountered by the spokes and again passed into the hub. The tire 17 does not bear the load under emergency conditions as is the case with conventional tires.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A safety tire comprising the combination of:
a wheel hub having a central opening for insertably receiving the end of an axle;
said wheel hub further having a plurality of stud receiving openings arranged in a circular pattern coaxial with respect to said central axle opening;
said wheel hub terminating in a circular flange extending outwardly from opposite sides of its circumferential periphery;
brace means fixed to said flange and radiating outwardly therefrom;
a flexible tire casing bonded to opposite sides of said flange and to said brace means so as to capture air between the interior of said tire and the opposing surface of said flange;
said brace means includes a plurality of braces or spokes of substantially U-shaped configuration arranged in fixed spaced apart relationship;
each of said braces comprises a pair of spatial legs outwardly supported from opposite sides of said flange and having the free ends of said legs joined by a cross member to complete said brace;
said tire casing includes sides bonded to said opposite sides of said flange and to said brace legs with a substantial space separating said cross members from the internal opposing surface of a tread portion joining said tire sides together.

2. The invention as defined in claim 1 wherein:
said wheel hub and said flange and said brace means are integral and constitute a single unitary construction.

3. The invention as defined in claim 2 including:
a reinforcement means integrally joining said flange mid-way between its opposite sides to said wheel hub peripherial edge.

4. The invention as defined in claim 3 wherein:
said reinforcement means is an integral cast construction.

5. The invention as defined in claim 3 wherein:
said reinfocement means includes an annular portion carried on said flange opposite from the surface thereof carrying said braces; and
weldments securing said annular portion to said wheel hub.

6. The invention as defined in claim 3 wherein:
said reinforcement means includes an annular portion carried on said flange surface opposite to its surface carrying said braces; and
bolt and nut fasteners securely joining said annular portion with said wheel hub to provide and integral, unitary construction.

7. The invention as defined in claim 3 wherein:
said tires casing sides bonded to said flange sides are disposed substantially around and along the undersurface of said flange.

8. The invention as defined in claim 7 wherein:
said tire casing is of a soft type and its sides are reinforced by said brace pair of legs to support the tire under load during a condition of deflation.

9. The invention as defined in claim 8 wherein:
said tire casing sides are embedded about said brace means pairs of legs and bonded along the opposite edges of said flange.

* * * * *